(12) United States Patent
Hong et al.

(10) Patent No.: US 11,726,873 B2
(45) Date of Patent: Aug. 15, 2023

(54) HANDLING MEMORY ERRORS IDENTIFIED BY MICROPROCESSORS

(71) Applicant: Micron Technology, Inc., Boise, ID (US)

(72) Inventors: Da Hong, Zhejian (CN); Kexian Huang, Shenzhen (CN); Qing Xu, Shenzhen (CN)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/556,550

(22) Filed: Dec. 20, 2021

(65) Prior Publication Data

US 2023/0195568 A1    Jun. 22, 2023

(51) Int. Cl.
*G06F 11/30* (2006.01)
*G06F 11/10* (2006.01)
*G06F 11/07* (2006.01)
*G06F 12/02* (2006.01)

(52) U.S. Cl.
CPC ........ *G06F 11/1068* (2013.01); *G06F 11/076* (2013.01); *G06F 11/0772* (2013.01); *G06F 11/3037* (2013.01); *G06F 12/0238* (2013.01)

(58) Field of Classification Search
CPC .............. G06F 11/1068; G06F 11/076; G06F 11/0772; G06F 11/3037; G06F 12/0238
USPC .......................................................... 714/764
See application file for complete search history.

(56) References Cited

U.S. PATENT DOCUMENTS

| | | | |
|---|---|---|---|
| 7,546,487 B2 | 6/2009 | Marisetty et al. |
| 8,468,422 B2 | 6/2013 | Chessin et al. |
| 9,535,774 B2 | 1/2017 | Cher et al. |
| 9,954,727 B2 | 4/2018 | Su et al. |
| 10,152,393 B2 | 12/2018 | Kelly et al. |
| 10,713,109 B2 | 7/2020 | Tarlano et al. |

(Continued)

FOREIGN PATENT DOCUMENTS

| | | |
|---|---|---|
| CN | 103198000 | 7/2013 |
| CN | 111984487 | 11/2020 |

(Continued)

OTHER PUBLICATIONS

International Search Report and Written Opinion, PCT/CN2021/085003, dated Jan. 6, 2022.

(Continued)

*Primary Examiner* — Albert Decady
*Assistant Examiner* — Enam Ahmed
(74) *Attorney, Agent, or Firm* — Greenberg Traurig

(57) ABSTRACT

A system, method and apparatus to optimize repair in a memory module based on hardware errors identified by microprocessors and a configurable error handling policy. For example, the error handling policy can have a configuration file identifying an amount of repair resources available in the memory module as manufactured. Repair status data can be stored in the memory module to determine repair resources currently available for repair. Further, the error handling policy can be configured with a list of high risk memory addresses prioritized for repair. The list can be used to schedule proactive repair in response to memory errors that would otherwise not be repaired during a typical restarting of the computer system having the memory module.

20 Claims, 7 Drawing Sheets

(56) References Cited

U.S. PATENT DOCUMENTS

| | | | |
|---|---|---|---|
| 2007/0162786 A1* | 7/2007 | Shuma | G06F 11/1008 |
| | | | 714/48 |
| 2009/0070630 A1 | 3/2009 | Khatri et al. | |
| 2011/0239088 A1* | 9/2011 | Post | G06F 11/1068 |
| | | | 714/763 |
| 2012/0239973 A1 | 9/2012 | Walton et al. | |
| 2014/0245106 A1* | 8/2014 | Leininger | G06F 11/1016 |
| | | | 714/764 |
| 2014/0351673 A1* | 11/2014 | Ware | G11C 29/808 |
| | | | 714/764 |
| 2015/0006962 A1 | 1/2015 | Swanson et al. | |
| 2016/0055052 A1 | 2/2016 | Hu et al. | |
| 2016/0055059 A1 | 2/2016 | Hu et al. | |
| 2018/0032399 A1* | 2/2018 | Johnson | G06F 11/142 |
| 2021/0255939 A1 | 8/2021 | Chaiken et al. | |
| 2021/0263868 A1 | 8/2021 | Maddukuri et al. | |

FOREIGN PATENT DOCUMENTS

| | | | |
|---|---|---|---|
| DE | 102021122170 A1 * | 3/2022 | |
| TW | I620061 | 4/2018 | |

OTHER PUBLICATIONS

Ana Gainaru, et al., "Fault prediction under the microscope: A closer look into HPC systems." Proceedings of the International Conference on High Performance Computing, Networking, Storage and Analysis, IEEE, 2012.

Lev Mukhanov, et al., "Workload-Aware DRAM Error Prediction using Machine Learning." IEEE International Symposium on Workload Characterization (IISWC), IEEE, 2019.

Xiaoming Du, et al., "Predicting Uncorrectable Memory Errors for Proactive Replacement: An Empirical Study on Large-Scale Field Data." 16th European Dependable Computing Conference (EDCC), 2020.

* cited by examiner

HANDLING MEMORY ERRORS IDENTIFIED BY MICROPROCESSORS

RELATED APPLICATIONS

The present application relates to U.S. patent application Ser. No. 17/245,761, filed Apr. 30, 2021 and entitled "Recording and Decoding of Information Related to Memory Errors Identified by Microprocessors", the entire disclosure of which is hereby incorporated herein by reference.

TECHNICAL FIELD

At least some embodiments disclosed herein relate to error processing in computer systems in general, and more particularly, but not limited to handling errors in a memory system accessed by microprocessors in execution of instructions.

BACKGROUND

Some microprocessors are configured with a mechanism, such as Machine Check Architecture (MCA), to report hardware errors to the operating system. Further, the microprocessors can have a System Management Mode (SMM) in which execution of the operating system and applications is suspended to run a set of instructions that are typically configured in the firmware of a computer system, such as the Basic Input/Output System (BIOS) of the computer system.

For example, in response to a hardware error in a server computer, a microprocessor of the server computer can store error data in MCA registers and enter the System Management Mode (SMM) to run a registered routine of the BIOS of the server computer. The registered routine of BIOS can be configured to retrieve the error data from the MCA registers of the microprocessor for use by the operating system of the computer system. The BIOS can pass the error data retrieved from the MCA registers to the operating system. Alternatively, the operating system may read the MCA registers directly, after the microprocessor returns from the System Management Mode (SMM) to the normal mode. Alternatively, the SMM may be disabled for handling memory correctable errors to allow the operating system to read the MCA registers and handle memory correctable errors directly. The operating system can then store the error data into a storage device (e.g., a hard drive disk) to facilitate error analysis, diagnosis, etc.

Intelligent Platform Management Interface (IPMI) is a set of computer interface specifications. An autonomous computer subsystem can use IPMI to manage and monitor a host computer system independently of the microprocessor of the host computer system. For example, a server computer can have a Baseboard Management Controller (BMC) configured on the motherboard of the server computer to implement IPMI.

For example, in response to a hardware error in the server computer, a Baseboard Management Controller (BMC) configured on the motherboard of the server computer can monitor the error events in the microprocessor of the server computer, retrieve the error data from the MCA registers in response to a hardware error, and store the error data from MCA registers into a storage area of the Baseboard Management Controller (BMC) for subsequent error analysis, diagnosis, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
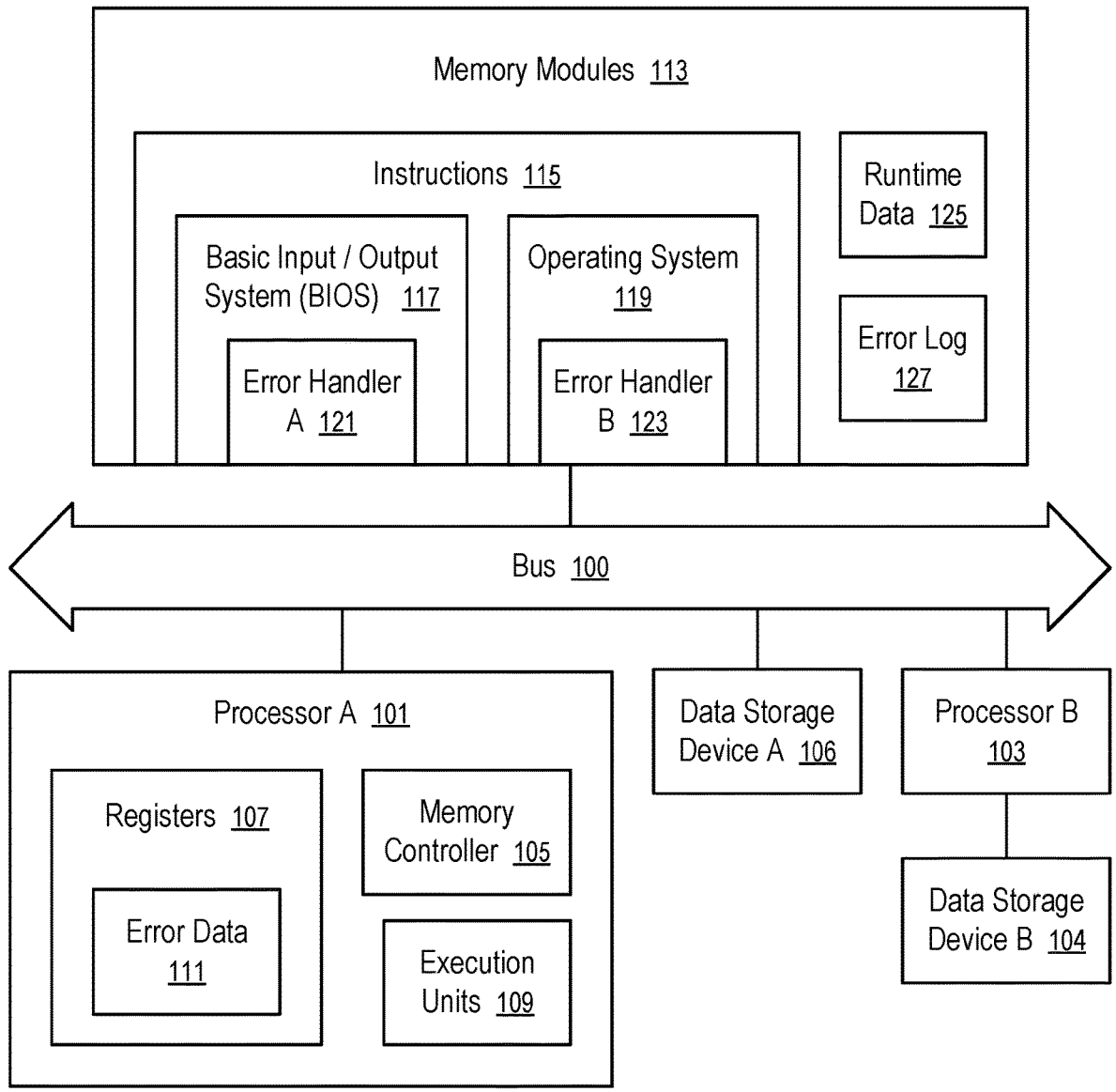
FIG. 1 illustrates an example computing system configured to handle a hardware error according to one embodiment.

At least some aspects of the present disclosure are directed to handling errors in a memory system accessed by microprocessors in execution of instructions. Techniques are provided to optimize the use of limited resources of Post Production Repair (PPR) for a memory module, based on improved server error logging to collect more and detailed data relevant to errors in the memory system to support improved repair, error handling, error analysis, diagnosis, etc.

Some hardware errors in a memory system are correctable (e.g., corrected after retrying an operation in the memory system). A correctable error does not require restarting the computer system. Other hardware errors in a memory system are uncorrectable (e.g., by retrying an operating in the memory system). If the firmware or software of the computer system cannot recover from the error, the computer system is configured to restart in response to such an uncorrectable error. Logging correctable error can be useful in predicting uncorrectable errors.

The restarting of the computer system can be a challenge for a successful transfer of certain data related to the error reported using Machine Check Architecture (MCA) registers of a microprocessor, since the data can be altered after the restarting the execution of the operating system.

A server computer can be configured with a Baseboard Management Controller (BMC) to retrieve error data from the MCA registers to a storage area of the Baseboard Management Controller (BMC). Since the Baseboard Management Controller (BMC) can continue its normal operation even when the server computer restarts as a response to an uncorrectable error, the error data retrieved by the Baseboard Management Controller (BMC) from the MCA registers can be preserved successfully after the restart of the server computer. However, such data retrieved by the Baseboard Management Controller (BMC) directly from the microprocessor of the server computer does not have accurate information about the memory address where the hardware error occurs and/or other information useful for the decoding, analysis of the error data retrieved from the microprocessor of the server computer.

A memory module can have a limited resource capacity to perform Post Production Repair (PPR). Different memory modules can be manufactured to have different amount of resources for Post Production Repair (PPR). After the resources are used, the memory module may be replaced to maintain the performance level of the server computer and/or avoid repeated restarting of the operating system of the computer system.

At least some aspects of the present disclosure address the above and other deficiencies by implementing a set of instructions to capture and store comprehensive data about a hardware error, which can be an uncorrectable error. The instructions, executed by the microprocessor encountering the error, can store the collected data about the error in a location in the computer system that is not affected by the restarting of the computer system. Further, the instructions can be configured via policies, configuration parameters and/or configuration files to prioritize repairs to optimize usage of repair resources, improve performance, reduce downtime, etc.

For example, the instructions can be configured to store the collected data in a predefined area of a memory module, such as a memory region in the memory module configured to support Serial Presence Detect (SPD). To support SPD a memory module has a non-volatile memory that stores information about the memory module. The non-volatile memory in the memory module can include a portion that can be used to store user data. The instructions configured to handle errors can store the collected data in such a portion in the non-volatile memory configured to support SPD.

For example, the instructions can be configured to communicate the collected data to the Baseboard Management Controller (BMC) so that the data can be preserved after the server computer restarts.

For example, an error handling policy can be configured in the operating system and/or in the Baseboard Management Controller (BMC) to prioritize and/or select error addresses in a memory module for repair. Before the restarting of the computer system, the errors can be analyzed based on the policy and/or configuration parameters to identify memory addresses for repair. Subsequently, during the boot phase, the computer system can use the limited resources to perform Post Production Repair (PPR) of the memory module having the identified memory addresses to avoid and/or minimize downtime of the server computer and/or performance impact in providing services of the server computer.

For example, error handling policies can be implemented at the Baseboard Management Controller of a server computer and/or in the operating system of the server computer. The polices can be configured to prioritize and/or identify critical issues that are selected for addressing via Post Production Repair (PPR). Thus, the limited resources for Post Production Repair (PPR) can be best used to reduce overall server downtime.

For example, historic data about Post Production Repair (PPR) performed in a memory module can be logged in a non-volatile memory, such as the non-volatile memory configured in the memory module to support Serial Presence Detect (SPD), or a non-volatile storage device in the Baseboard Management Controller (BMC). The historic PPR data contains the PPR results and/or statuses of past repairs performed in the memory module. The historic PPR data can be reviewed to investigate past repair activities. Further, the historic PPR data can be used to evaluate the current availability of PPR resources in the memory module and determine an optimized error handling strategy in view of the currently available PPR resources in the memory module, and/or past repair activities.

For example, error handling policies can be configured based on inputs identifying high risk addresses to allow proactive repair using Post Production Repair (PPR) resources. The proactive repair can be performed to address critical issues to reduce server downtime and improve the overall performance of the server computer. For example, the supplier/manufacturer of the memory module and/or the user of the memory module can identify high risk addresses. Such addresses can be identified based on detailed error log information recorded and/or collected for the memory module and/or similar modules. A predictive model can be trained (e.g., using an Artificial Neural Network, a decision tree, or another technique) to predict a high risk memory error for proactive repair using PPR resources.

For example, when the historic PPR data indicates that there are insufficient resources to perform repairs, the error handling policies can be configured to cause the server computer to deploy temporary measures to address memory errors. For example, pages of memory containing errors can be blocked from further accesses. For example, page blocking, rank page out, page offline, etc. can be used to avoid repeated memory errors.

At least a portion of the instructions can be configured in the firmware (e.g., the Basic Input/Output System (BIOS) of the server computer) and/or in the operating system. Comprehensive data about the hardware error is collected and preserved even when the server computer restarts as a result of the error. The collected data can be used in combination with error handling policies, configuration parameters, and/or failure/risk predictions, to optimize use of repair resources and prioritize error handling strategies.

For example, the instructions configured in the firmware are used to collect data that can be changed by restarting of the operating system; and additional data that does not change by restarting of the operating system can be collected using the instructions configured in the operating system (e.g., to reduce the time of the execution of the instructions in the firmware in the system management mode in which the execution of the operating system is suspended). For example, the instructions can be programmed to collect the temperature of the memory module and/or the microprocessor at the time of the hardware error, the timestamp of the hardware error, an error count of the hardware error event reported by the memory module, the address information of the hardware error (e.g., the identification of a memory module, a group of memory bank in the memory module, a memory bank in the group, a row and a column in the memory bank in which the hardware error occur), a classification of the Machine Check Exception (MCE), a type of the hardware error, the setting and/or configuration parameters of the memory module that has the hardware error, the identification/serial number of the memory module in which the hardware error occurs, timing parameters of the memory module and/or the server computer at a time of the hardware error, etc.

After comprehensive data about hardware errors in a memory module is collected and preserved, even after the computer restarts as a response to the hardware errors, the collected data can be analyzed (e.g., by a supplier of memory modules) to improve memory modules to reduce errors. The comprehensive data can be used to predict future failures and reduce costs associated with hardware errors in services.

Based on a set of configurable error handling policies, the server computer can use failure predictions, repair resource statuses and/or history, and repair preferences specified by the operator of the server computer to prioritize use of repair resources and error handling strategies.

FIG. 1 illustrates an example computing system configured to handle a hardware error according to one embodiment.

The computing system of FIG. 1 includes a processor 101 coupled to one or more memory modules 113, a data storage device 106 and a separate processor 103 via a bus 100. The bus 100 can include one or more buses, such as a memory bus having an address bus, a data bus and a control bus, a peripheral bus, a System Management Bus, and/or an Inter-Integrated Circuit bus, etc. Thus, the bus 100 is limited to a particular implementation of interconnect among the components. For example, the memory module 113 can be a registered memory module, such as a registered dual in-line memory module (RDIMM).

The one or more memory modules 113 store instructions 115 for execution by a processor 101. The instructions 115 can include firmware, such as a Basic Input/Output System (BIOS) 117. The instructions 115 can include software, such as an operating system 119, and applications that programmed to use the services provided by the operating system 119.

The processor 101 includes a memory controller 105 that can load instructions 115 from the memory modules 113 for execution, and execution units 109 configured to perform operations identified by the instructions 115.

The processor 101 includes a set of registers 107 that are configured to store error data 111 when the processor 101 encounters a hardware error. For example, the registers 107 can be Machine Check Architecture (MCA) registers.

Typically, the error data 111 is encoded by the processor 101 for compact reporting of the hardware error to the operating system 119. Decoding the error data 111 for an error in accessing a memory location in the memory modules 113 can require additional data that may not be available once the computing system restarts the execution of the operating system 119.

In response to an error in accessing a memory location in the memory module 113, the processor 101 runs the Basic Input/Output System (BIOS) 117 (e.g., in a System Management Mode (SMM)). The Basic Input/Output System (BIOS) 117 can be programmed to include an error handler 121. When executed in the processor A 101 in response to a hardware error encountered by the processor 101, the error handler 121 causes the processor 101 to collect data relevant to the hardware error, including the error data 111 and additional data, to generate the error log 127.

For example, the additional data can include runtime data 125 of the computing system, such as the temperature of a memory module in which the hardware error occurs, the identification number of the memory module, the operation setting/configuration parameters of the memory module (e.g., timing parameters of the memory module), etc.

The error handler 121 as executed in the processor 101 can decode the error data 111 retrieved from the registers 107 in determining the physical memory address of the memory location where the hardware error occurs. For example, the error handler 121 can be configured to collect information that will, or is likely to, change as a result of restarting the computing system, such as the temperature of the memory module and/or the microprocessor at the time of the hardware error, the timestamp of the hardware error, an error count of the hardware error event reported by the memory module, the address information of the hardware error (e.g., the identification of a memory module, a group of memory banks in the memory module, a memory bank in the group, a row and a column in the memory bank in which the hardware error occur), a classification of the Machine Check Exception (MCE), a type of the hardware error, etc. Information that is not likely to change due to restarting of the computing system can be configured to be collected via an error handler 123 configured in the operating system 119 to reduce the impact of the execution of the error handler 121 to the execution of the operating system 119. For example, the error handler 123 can be used to collect the setting and/or configuration parameters of the memory module that has the hardware error, the identification/serial number of the memory module in which the hardware error occurs, timing parameters of the memory module and/or the server computer at a time of the hardware error, version numbers of software, etc.

The error handler 121 is programmed to store the error log 127 in a location without the assistance of the operating system 119.

For example, the error log 127 about a hardware error in a memory module can be stored, via the execution of the error handler 121, in a user data area of a non-volatile memory of the memory module configured to support Serial Presence Detect (SPD). The non-volatile memory configured to support SPD can be referred to as SPD memory.

Storing the error log 127 in a non-volatile memory of the memory module in which the error occurs allows the memory module to be removed from the computing system of FIG. 1, attached to an alternative system for the retrieval of the error log 127 for diagnosis, analysis, and/or fault mitigation. For example, the memory module can provide Dynamic Random Access Memory (DRAM) to the processor 101. When the execution of the operating system 119 is restarted, the content previously stored in the DRAM is erased. When the error log 127 is stored in the SPD memory of the memory module, the error log 127 is preserved after the restart of the computing system and/or after the power is removed from the memory module for a period of time.

Alternatively, or in combination, the error handler 121 can be programmed to communicate the error log 127 to a separate processor 103, which stores the error log 127 into a data storage device 104 that is operated by the separate processor 103 independently from the main processor 101 that runs the instructions 115.

For example, the processor 101 can be the main processor of the computing system of FIG. 1 to run the instructions; and the separate processor 103 and the data storage device 104 can be configured as a Baseboard Management Controller (BMC) to monitor and manage the operations of the main processor 101. The data storage device 104 of the Baseboard Management Controller (BMC) can be a portion of volatile memory configured for the processor 103, and/or a persistent and/or non-volatile storage device configured in the Baseboard Management Controller (BMC).

The Baseboard Management Controller (BMC) can operate autonomously and independently from the main processor 101 running the Basic Input/Output System (BIOS) 117 and/or the operating system 119. The main processor 101 executing the error handler 121 can communicate the error log 127 for the current hardware error to the Baseboard Management Controller (BMC) using Intelligent Platform Management Interface (IPMI). When the main processor 101 restarts the execution of the operating system 119, the error log 127 in the Baseboard Management Controller (BMC) is not affected and thus is preserved.

The error handler 121 in the Basic Input/Output System (BIOS) 117 can pass the error log 127 about the current hardware error to the operating system 119 after the execution of the operating system 119 is restarted following an uncorrectable error, or after the execution of the operating system 119 is resumed following a correctable error.

The processor 101 running the operating system 119 can access the data storage device 106, such as a hard drive, a solid state drive, etc. For example, the operating system 119 can include an error handler 123 that is programmed to store the error log 127 in a file system for subsequent use.

After an uncorrectable error occurs in the memory modules 113, the processor 101 runs the Basic Input/Output System (BIOS) 117 (e.g., in a System Management Mode (SMM) to suspend the execution of the operating system 119 and applications that use the services of the operating system 119). The processor 101 running the error handler of the Basic Input/Output System (BIOS) 117 initially stores the error log 127 in a location that is not affected by the restarting of the computing system (e.g., in SPD memory and/or in the data storage device 104 of a Baseboard Management Controller). After restarting the execution of the operating system 119, the processor 101 running the error handler 123 in the operating system 119 can retrieve the error log 127 from the location to record the error log into a file in the data storage device 106 controlled by the operating system 119.

When the hardware error is correctable, the processor 101 can resume the previous execution of the operating system 119 after the execution of the error handler 121 in the Basic Input/Output System (BIOS) 117, without restarting the computing system of FIG. 1. Optionally, in response to a correctable error, the error handler 121 in the Basic Input/Output System (BIOS) 117 passes the error log 127 to the error handler 123 in the operating system 119 (e.g., using a memory shared between the Basic Input/Output System (BIOS) 117 and the operating system 119) without preserving the error log 127 into the location that is not affected by the restarting of the computing system.

Figure 2:
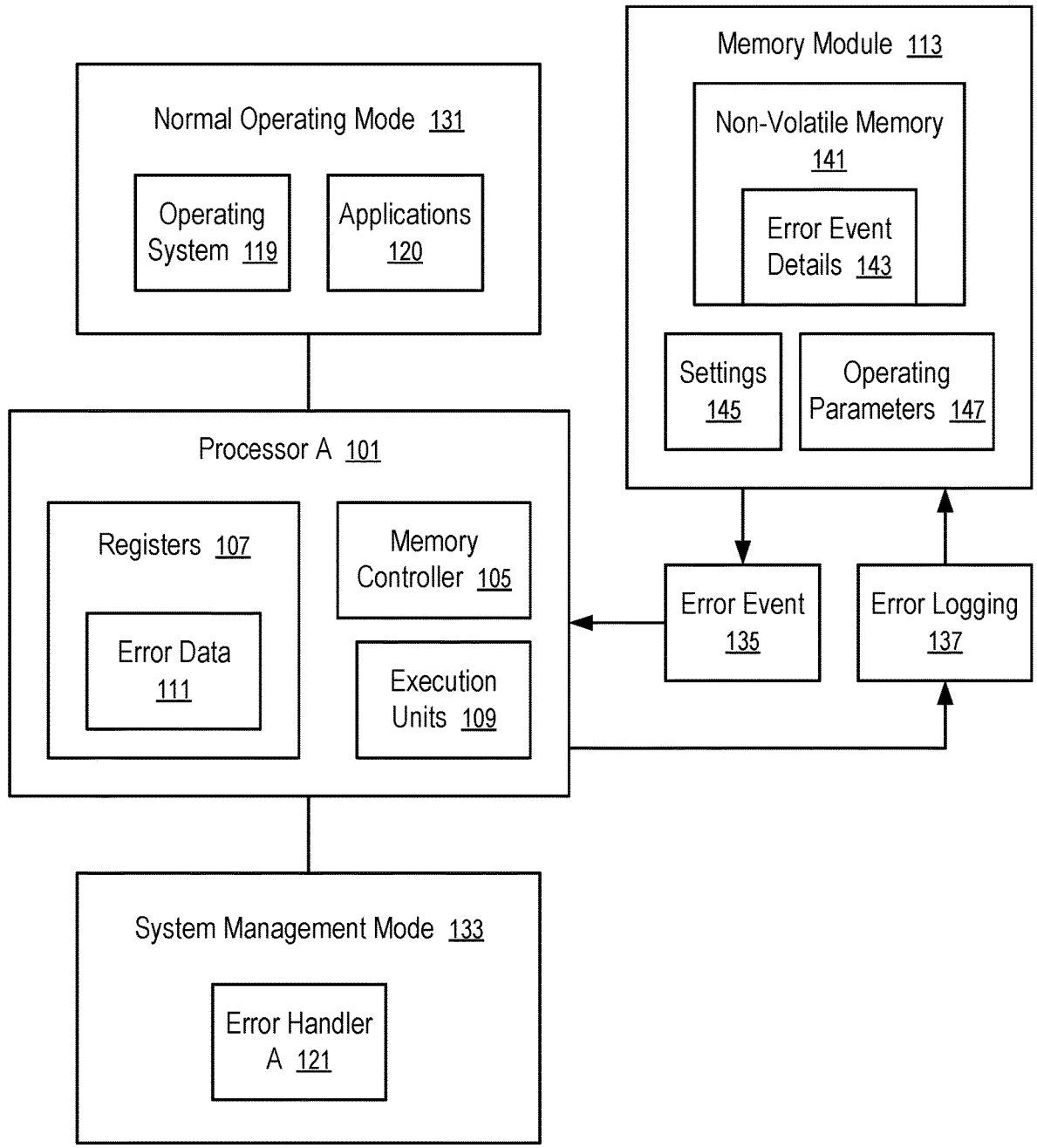
FIGS. 2 and 3 show techniques to record data related to an error in a memory module according to some embodiments.
Figure 3:
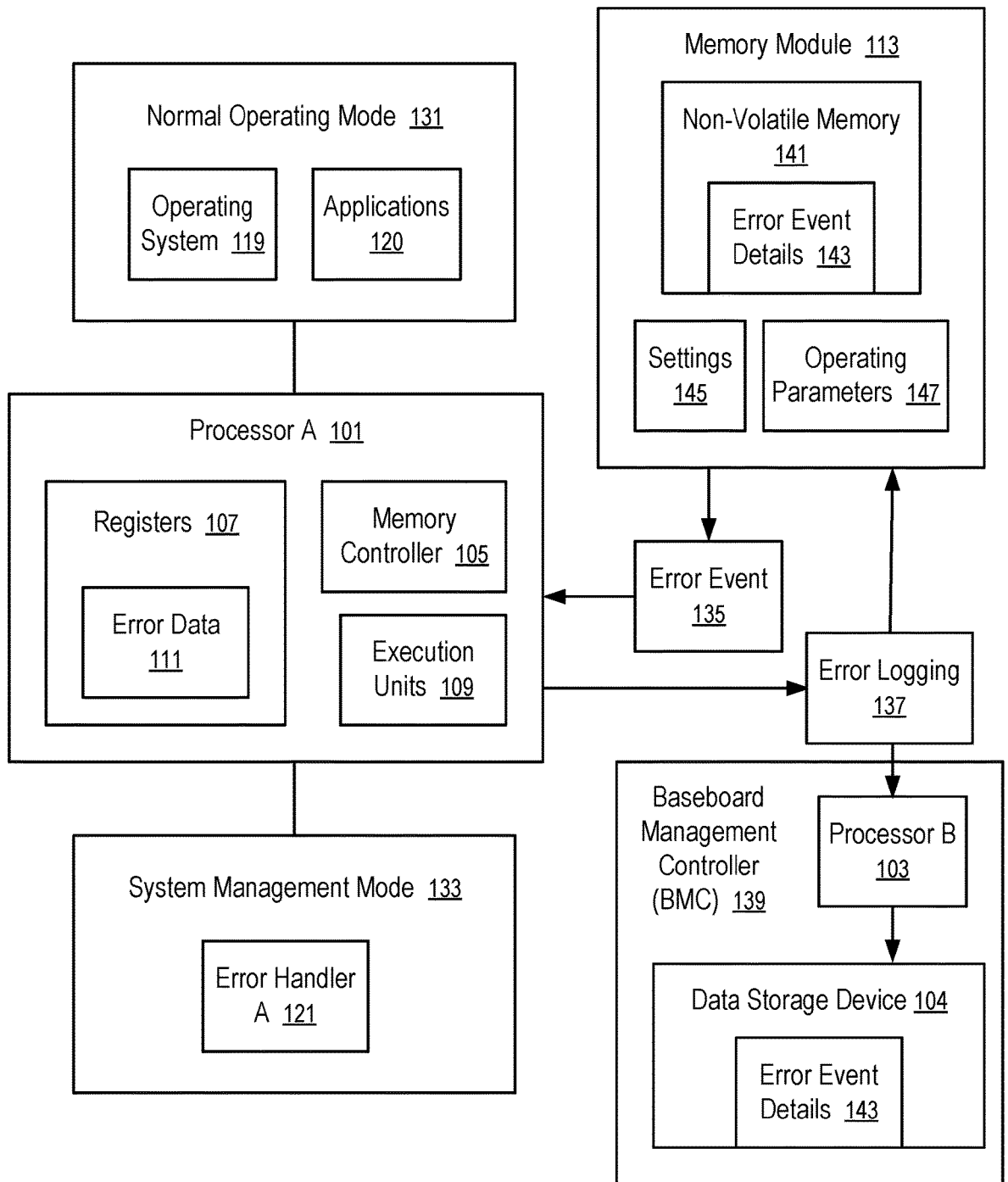

FIGS. 2 and 3 show techniques to record data related to an error in a memory module according to some embodiments. For example, the techniques of FIGS. 2 and 3 can be implemented in the computing system of FIG. 1.

In FIG. 2, the processor 101 can operate in a normal operating mode 131 to execute instructions of an operating system 119 and applications 120 that use the services of the operating system 119. Further, the processor 101 can operate in a system management mode 133 in which the execution of the instructions of the operating system 119 and applications 120 is suspended to run the error handler 121 of the Basic Input/Output System (BIOS) 117, in response to an indication of an error event 135 from a memory module 113.

The memory module 113 has a non-volatile memory, such as a SPD memory, that is not used by typically operations of the operating system 119 and the applications 120.

During the execution of the error handler 121 in the system management mode 133, the processor 101 decodes the error data 111 to generate the error event details 143 for the error event 135. In an operation of error logging 137, the processor 101 running the error handler 121 stores the error event details into the non-volatile memory 141 of the memory module 113 (e.g., a user-accessible portion of SPD memory).

For example, the error event details 143 can include the physical address of the memory location in the memory module 113 has the error event (e.g., row and column addresses of the memory location) by decoding the error data 111 in the registers 107 of the processor 101.

The error event details 143 can include the settings 145 of the memory module 113 at the time of the error event 135 and the operating parameters 147 of the memory module 113 and/or the computing system, such as temperature, timing parameters, etc.

The error event details 143 can be used after the memory module 113 is restarted and/or after being powered off for a period of time, without relying upon the state the computing system and/or without requiring the processor 101 to resume the suspended execution of the operating system 119.

Optionally, the error event details 143 can include an identification of the memory module 113, an identification of the processor 101, a context of the error event 135, an operating condition of the processor 101 and/or the memory module 113 at the time of the event 135. The error event details can be used to analyze the causes of errors, to predict future errors, to improve the design of memory modules to avoid or reduce errors, etc.

In FIG. 3, the operation of error logging 137 performed via the processor 101 executing the error handler 121 communicates the error event details 143 to a Baseboard Management Controller (BMC) 139. The processor 103 of the Baseboard Management Controller (BMC) 139 stores the error event details 143 into a data storage device 104 controlled by the processor 103. Restarting of the execution of the operating system 119 in the main processor 101 does not affect the error event details 143 recorded in the Baseboard Management Controller (BMC) 139.

Optionally, the error event details 143 is stored in the data storage device 104 but not in the non-volatile memory 141 of the memory module 113.

Figure 4:
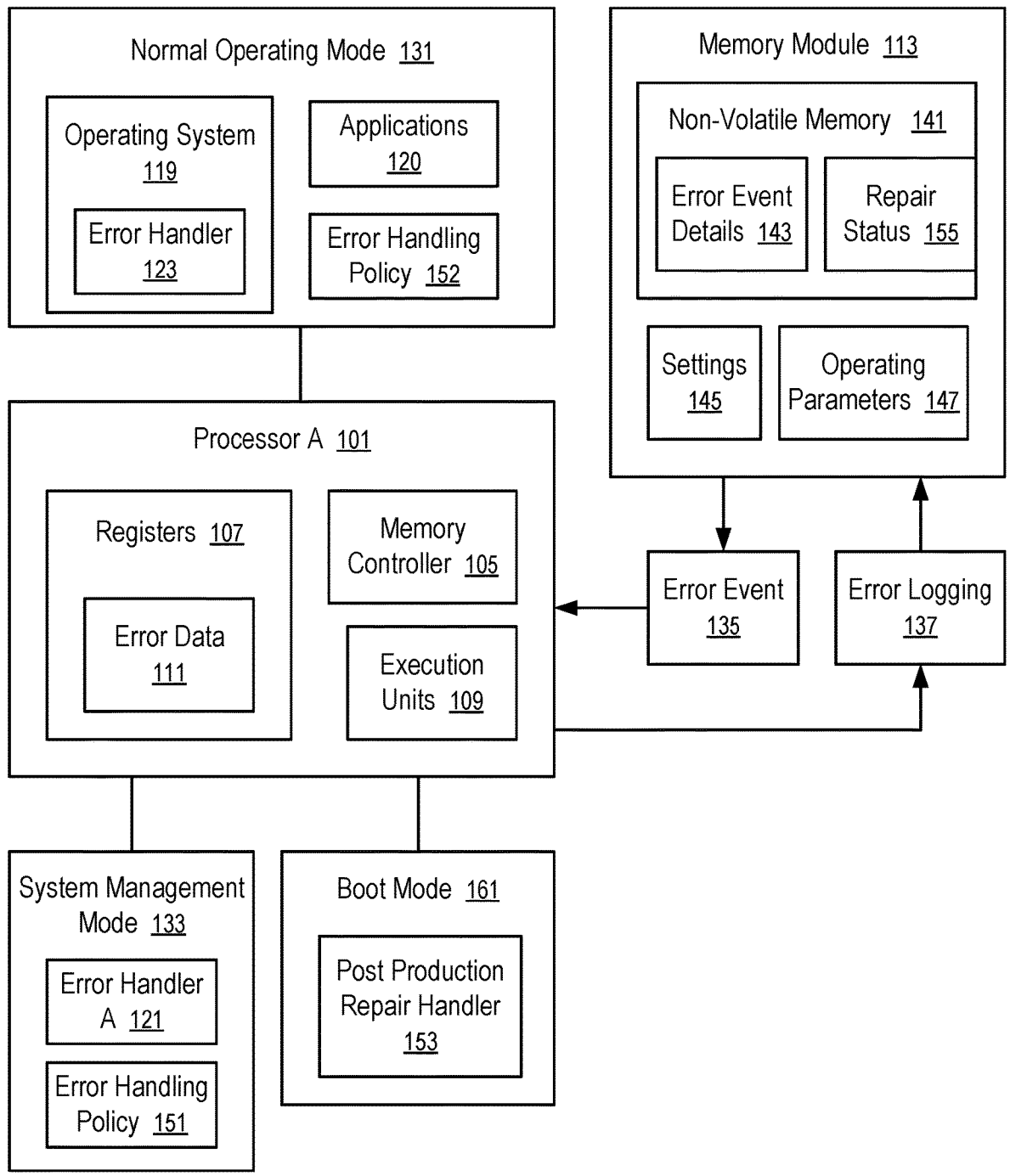
FIGS. 4 and 5 show techniques to handle errors in a memory module according to some embodiments.
Figure 5:
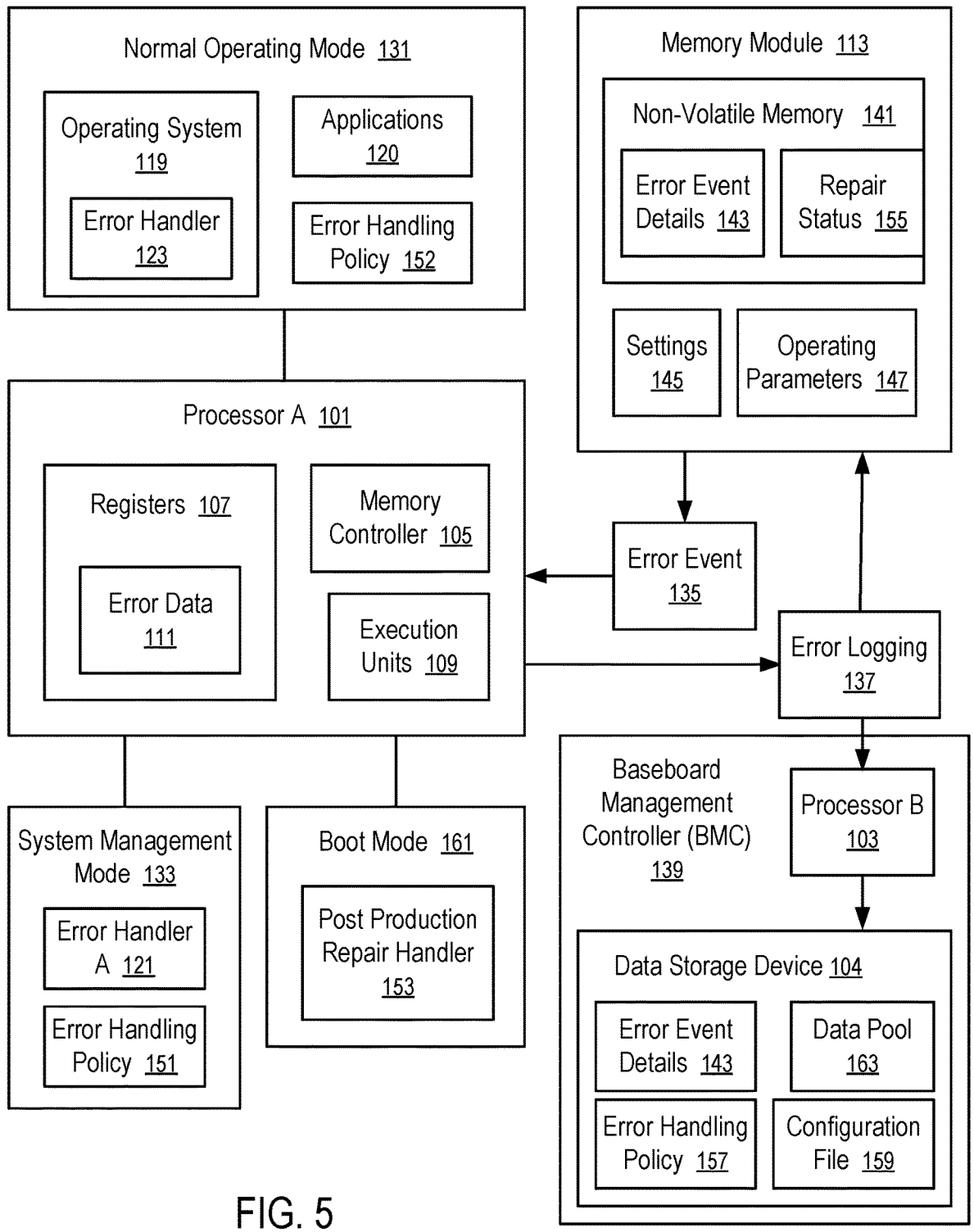

FIGS. 4 and 5 show techniques to handle errors in a memory module according to some embodiments. For example, the techniques of FIGS. 4 and 5 can be implemented in the computing system of FIG. 1 in combination with the techniques of FIG. 2 and/or FIG. 3 to record data related to an error in a memory module.

In FIGS. 4 and 5, the memory module 113 is manufactured to include a set of resources to perform post production repair. For example, the memory module 113 can be manufactured to include a number of spare rows of memory cells. When a row of memory cells in the memory module 113 is to be repaired, the processor 101 can transmit commands to the memory module 113 to cause the memory module 113 to perform row repair. For example, row repair can be implemented via the memory module 113 replacing the use of a defective row of memory cells with the use of a spare row of memory cells. For example, the processor 101 can be configured via a post production repair handler 153 executed during a boot mode 161 of starting up the computer system to issue repair commands to the memory module 113 to cause the row repair in the memory module 113.

Row repair is an example of repair techniques implemented in the memory module 113. In general, the post production repair handler 153 can be configured to use various repair commands for corresponding repairs implemented in the memory module 113. After the execution of the post production repairs, the memory module 113 can provide the same, or substantially the same, memory performance and services as when the memory module 113 is initially manufactured.

The memory module 113 has a limited repair resources (e.g., spare rows of memory cells). Thus, it is desirable to optimize the use of the repair resources to improve the overall performance of the computer system.

In FIG. 4, an error handler 121 has a configurable error handling policy 151 to selectively schedule post production repairs performed during the boot mode 161.

For example, based on the error event details 143, the error handler 121 can select memory addresses to be repaired; and the selections are performed according to priorities and rules specified in the error handling policy 151. The selected memory addresses are stored as input for the post production repair handler 153.

For example, the memory addresses selected as input to the post production repair handler 153 can be stored in the non-volatile memory 141 of the memory module 113, such as a user-accessible portion of SPD memory of the memory module 113. Alternatively, the memory addresses selected as input to the post production repair handler 153 can be stored in a non-volatile memory device that is separate from the memory module 113.

When the computer restarts and operates in the boot mode 161, the post production repair handler 153 can be executed by the processor 101 to retrieve the memory addresses selected as input to the post production repair handler 153 and generate commands to the memory module 113 to perform repair. According to the repair operations, historic repair status 155 can be stored (e.g., in the non-volatile memory 141 of the memory module 113, and/or a separate non-volatile memory device) to indicate repair resources uses, results of repair and/or statuses of repair.

Subsequently, the repair status 155 can be retrieved by the error handler 121 to determine remaining resources available in the memory module 113 to perform further repairs. Further selection of memory addresses for repair can be based on the availability of resources, the error handling policy 151, and/or results of past repairs.

The error handling policy 151 can be configured to specify different preferences for the selection of memory addresses for repair.

For example, memory addresses having uncorrectable errors and/or correctable errors having retries above a threshold number of times can be candidates for repair. Instead of prioritizing memory addresses for repair according to the chronological order of respective error records, the error handling policy 151 can be configured to prioritize certain memory addresses for repair.

For example, the error handling policy 151 can be configured to remove correctable errors from candidates for repair and target uncorrectable errors for repair.

For example, the error handling policy 151 can be configured to select non-recoverable uncorrectable errors for repair, and exclude recoverable uncorrectable errors and correctable errors from post production repairs.

For example, a list of high risk memory addresses can be specified as a part of the configuration of the error handling policy 151. When a memory address having an error is not in the list, the error handler 121 can skip the memory address for repair, even though there are available repair resources in the memory module 113.

For example, the high risk memory addresses can be prioritized in the list. When there are many memory addresses in the list having errors, the error handler 121 can be configured via the error handling policy 151 to select the highest priority error memory addresses for repair according to the priorities identified in the list.

Optionally, high risk memory addresses can be identified via memory regions.

Optionally, high risk memory addresses can be predicted based on past error reports in relation with computing activities.

Optionally, high risk memory addresses can be prioritized based on the priorities of software programs using the memory addresses. For example, when the memory usage pattern changes, the operating system 119 can dynamically adjusts the priority input to the error handling policy 151.

The error handling policy 151 can be configured to identify the maximum repair resources available in the memory module 113 when the memory module 113 is initially delivered by the supplier or manufacturer of memory modules. The maximum repair resources and the historic repair status 155 can be combined to determine the currently available repair resources.

When the currently available repair resources are insufficient, the error handling policy 151 can be configured to implement temporary measures to block access to memory addresses that have errors. Such measures can include page blocking, rank map out, page offline, etc.

Optionally, memory addresses selected for post production repair, historic repair status 155, error event details 143, error handling policy 151, and/or error handler 121 can also be configured on a Baseboard Management Controller (BMC) 139 and/or in the operating system 119, as further discussed in connection with FIG. 5.

In FIG. 5, the processor 103 in the Baseboard Management Controller (BMC) 139 can run a version of the error handler 121 controlled by an error handling policy 157, independently from operations of the processor 101. When the computer system has an error handler 121 configured with an error handling policy 157 running in the processor 103 of the Baseboard Management Controller (BMC), the error handler 121 in the system management mode 133 and/or the error handler 123 running in the operating system 119 can be omitted. When the computer system has an error handler 123 running with an error handling policy 152 in the operating system 119 and an error handler running with an error handling policy 157 in the Baseboard Management Controller (BMC) 139, the error handlers in the operating system 119 and the Baseboard Management Controller (BMC) 139 can interact with each other to coordinate error data, configuration parameters, and/or error handling operations. When the operating system 119 is configured to support recovery of error data 111 from MCA registers 107 of the processor 101, the error handler 123 running in the operating system 119 can handle repairs of not only recoverable uncorrectable memory errors, but also non-recoverable uncorrectable memory errors.

As in FIG. 3, the processor 103 in the Baseboard Management Controller (BMC) can be configured to record error event details 143 in response to communications of error logging 137 from the processor 101.

The data storage device 104 of the Baseboard Management Controller (BMC) 139 can store the error event details 143.

Based on the error event details 143 and the error handling policy 157 stored in the data storage device 104 of the Baseboard Management Controller (BMC) 139, the processor 103 of the Baseboard Management Controller (BMC) 139 running the error handler 121 can select memory addresses for post production repair into a data pool 163 in the data storage device 104. When in the boot mode 161, the post production repair handler 153 can access the data pool 163 in the Baseboard Management Controller (BMC) 139 to generate commands to the memory module 113 to perform repair that are requested and/or scheduled in the data pool 163. Information about the repairs performed by the post production repair handler 153 can be stored into the data storage device 104 of the Baseboard Management Controller (BMC) 139, the non-volatile memory 141 of the memory module 113, and/or another non-volatile memory/storage device accessible to the processor 101 and/or the processor

103. In general, the repairs performed by the post production repair handler 153 can be based on repair configuration/schedule, available resources, and repair results (e.g., repair status 155) identified by the error handlers running in the operating system 119, the system management mode 133, and/or the Baseboard Management Controller (BMC) 139 in various data storage locations.

Optionally, the error handler 121 running in the main processor 101 is configured to select certain correctable errors and/or uncorrectable errors for proactive repair (e.g., based on a prioritized list of high risk addresses and an error handling policy 151); and the error handler 121 running in the processor 103 of the baseboard management controller 139 is configured to select non-recoverable uncorrectable errors for repair (e.g., based on the selection made by the processor 101, and the error handling policy 157).

For example, the error handling policy 157 can have a configuration file 159 that specifies the maximum manufacturer-supplied repair resources in memory modules (e.g., 113) connected to and used by the processor 101. The historic repair status 155, stored in the memory module 113, in the storage device 104 of the Baseboard Management Controller (BMC) 139, and/or in another non-volatile memory device, can be used to determine the repair resources that have been used and thus the currently remaining resources available to implement repairs. The repair requests scheduled in the data pool 163 can be generated within the limit of the currently available repair resources.

When the error event details 143 identify more memory faults than that can be repaired using the currently available repair resources, the error handler 121 (e.g., running in the processor 101 and/or processor 103) can schedule temporary measures to prevent the use of portions of the memory module to avoid instruction executions in the processor 101 from accessing memory addresses that have faults. The temporary measures reduce the memory available to the processor 101 and thus reduce the performance level of the computer system. However, temporary measures can prevent data losses, downtime, and allow transition to a scheduled maintenance during which a replacement memory module can be installed in place of the faulty memory module 113.

Figure 6:
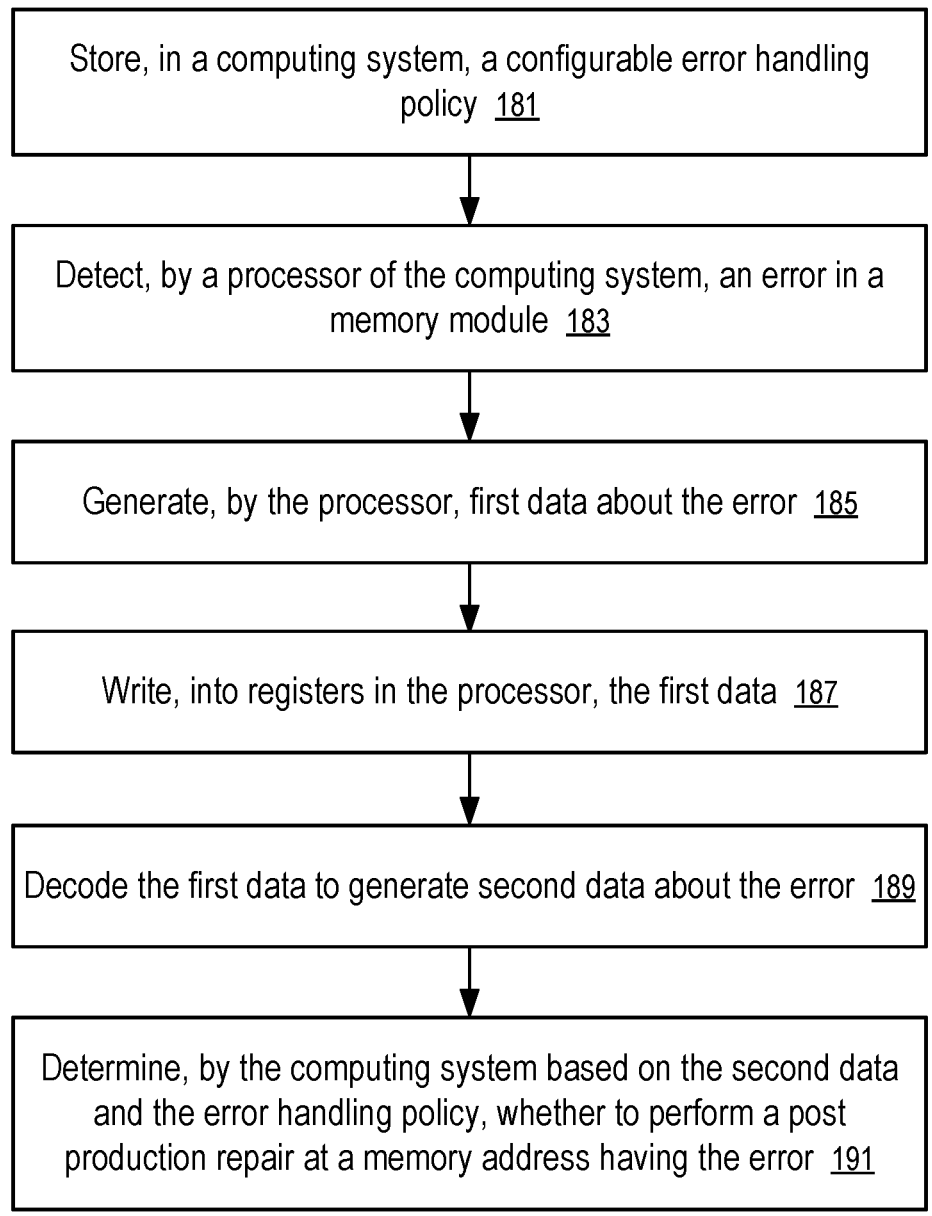
FIG. 6 shows a method to handle memory errors according to one embodiment.

FIG. 6 shows a method to handle memory errors according to one embodiment. For example, the method of FIG. 6 can be implemented in the computing system of FIG. 1 using the configurable error handling techniques of FIG. 4 and/or FIG. 5 in combination of the techniques of FIG. 2 and/or FIG. 3 to record data related to an error in a memory module.

At block 181, a computing system (e.g., as in FIG. 1) stores a configurable error handling policy (e.g., 151 and/or 157).

For example, the computing system can receive an input identifying a first amount of repair resources available in the memory module 113 as manufactured (e.g., available when the memory module 113 is freshly delivered as a new product from a manufacturer or supplier of memory modules). The computing system can write the input to a configuration file 159 of the error handling policy 157. In response to the operations of a post production repair handler 153 executed during a boot mode 161 of the computing system, the computing system can store historic data identifying repairs performed in the memory module 113. The historic data (e.g., repair status 155) can identify the repair resources used during the operations of the post production repair handler 153 and/or the statuses and/or results of the performed repairs. Based on the first amount of repair resources and the historic data of repairs performed in the memory module, the computing system can identify a second amount of repair resources currently available in the memory module to implement repairs. Thus, the determination of whether to perform a post production repair can be performed further based on the second amount of repair resources.

Optionally, the historic data of repairs performed in the memory module can be stored in a non-volatile memory 141 of the memory module 113, such as the Serial Presence Detect (SPD) memory of the memory module 113.

For example, the computing system can receive a list identifying a plurality of memory addresses and write the list to the configuration file 159 of the error handling policy (e.g., 157 and/or 151). The determination of whether to perform the post production repair can be further based at least in part on whether the memory address is in the plurality of memory addresses.

Optionally, the computing system can be configured to predict the plurality of memory addresses based on risk assessment. For example, the plurality of memory addresses are predicted to have memory errors based on a pattern of operations in the computing system.

At block 183, a processor 101 of the computing system detects an error in a memory module 113 during execution of instructions to access the memory module 113.

In response to the error, at block 185, the processor 101 generates first data about the error.

At block 187, the processor 101 writes, into registers 107 in the processor, the first data.

For example, the error causes the computing system to enter a system management mode 133 and to execute instructions of an error handler 121 to process the first data, such as the error data 111 stored in the registers 107 configured to implement Machine Check Architecture (MCA). When the error is correctable, the system can return to the execution of the operating system 119 without restarting. Optionally, the operating system 119 can run an error handler 121 that has an error handling policy 151 configured to select memory addresses for proactive repairs (e.g., according to a list of high risk memory addresses).

At block 189, the processor 101 decodes the first data to generate second data about the error.

For example, the second data can include the error event details 143 recorded into a non-volatile memory 141 of the memory module 113 and/or a data storage device 104 of a Baseboard Management Controller (BMC) 139 of the computing system. For example, the decoding of the first data can include determining a memory address having the error and providing the memory address in the second data.

At block 191, the computing system determines based on the second data and the error handling policy (e.g., 151, 157), whether to perform a post production repair at a memory address having the error.

For example, the computing system can execute instructions of an error handler (e.g., 121 and/or 123) to determine whether to perform the post production repair at the memory address identified in the second data. The instructions can be implemented as part of an operating system 119 executed in the normal operating mode 131 and/or a routine executed in a system management mode 133.

Alternatively, or in combination, the instructions can be implemented in the Baseboard Management Controller (BMC) 139 of the computing system.

For example, the error handler 121 executed by the processor 101 can have an error handling policy 151 configured/customized to proactively select the memory address for the post production repair, in response to the memory address being in the plurality of high risk memory addresses. The selection can be made even before the error is determined to be non-recoverable. Thus, even though the error may be recoverable and/or correctable, since the memory address is in the high risk list, it can be beneficial to proactively repair it during the next restart to avoid a possible disruption.

For example, the error handler (e.g., 121 and/or 123) executed by the processor 101 can have an error handling policy (e.g., 151 and/or 157) configured/customized to not select memory address for post production repair, in response to a determination that there are insufficient repair resources available to repair a plurality of errors in the memory module for a subsequent restart of the computing system, such as when the other memory addresses having errors having higher priority according to the error handling policy (e.g., 151 and/or 157). When the memory address is not selected for repair, the error handler 121 can be configured to take measures to prevent the processor 101 from further accessing the memory address. For example, the prevention can be implemented via page block and/or rank map out implemented in Basic Input/Output System (BIOS) 117.

For example, the error handling policy 151 processed using the operating system 119 executed by the processor 101 is configured to select from memory addresses having uncorrectable and/or correctable errors for repair in view of a list of high risk memory addresses; and the error handling policy 157 processed using the Baseboard Management Controller (BMC) is configured to select from memory addresses having non-recoverable uncorrectable errors for repair.

Subsequently, in a next operation to boot up the computer system, the computer system can execute post production repair handler 153 in a boot mode 161 of the computer system. The execution of the post production repair handler 153 by the processor 101 causes commands to be generated for the post production repair of the selected memory addresses in the memory module 113. The commands are transmitted to the memory module 113; and the repair status 155 and/or results are stored for subsequent operations of the error handlers (e.g., 121, 123) executed by the processor 101 and/or in the Baseboard Management Controller (BMC) 139. For example, the repair status 155 and/or results can be stored in the non-volatile memory 141 of the memory module 113, in the data storage device 104 of the Baseboard Management Controller (BMC) 139, or another device (e.g., 106).

In one embodiment, a method is provided to log data related to a hardware error according to one embodiment. For example, the method can be implemented in the computing system of FIG. 1 using the techniques of FIG. 2 and/or FIG. 3 to record data related to an error in a memory module.

In the method, a processor 101 of a computing system (e.g., as illustrated in FIG. 1) detects an error in a memory module 113 (or in another hardware component of the computing system).

For example, the processor 101 can be a microprocessor configured with a mechanism report hardware errors to the operating system 119 running in the microprocessor, such as Machine Check Architecture (MCA).

Then, the processor 101 generates first data (e.g., error data 111) about the error and writes, into registers 107 in the processor 101, the first data (e.g., error data 111).

For example, the first data (e.g., error data 111) can be in an encoded format according to a predefined specification of Machine Check Architecture (MCA).

To report the hardware error to the operating system 119 running in the processor 101, the processor 101 can enter a mode (e.g., System Management Mode 133) in which the execution of the operating system 119 is suspended to execute firmware of the computing system to process the first data (e.g., error data 111). The firmware can be programmed to include an error handler 121. When the error handler 121 is executed in the processor 101, second data is generated and stored.

Then, the processor 101 starts to execute first instructions (e.g., error handler 121) in firmware of the computing system (e.g., as illustrated in FIG. 1).

For example, the first instructions (e.g., error handler 121) can be configured as part of a Basic Input/Output System (BIOS) of the computing system, which is executed in response to a hardware error in a system management mode 133.

Then, the processor 101 generates, via execution of the first instructions (e.g., error handler 121), second data (e.g., error log 127, error event details 143) about the error based at least in part on the first data (e.g., error data 111) in the registers 107.

Then, the processor 101 stores, via execution of the first instructions (e.g., error handler 121), the second data (e.g., error log 127, error event details 143) at a location that is not affected by restarting execution of an operating system 119 in the processor 101.

For example, during restarting execution of the operating system 119, the processor 101 runs the Basic Input/Output System (BIOS) 117 to initialize the states of various components in the computing system. The initialization operation can clear the data in at least a portion of the capacity of the memory modules 113. Thus, the restarting of the execution of the operating system 119 can affect this portion of the memory modules 113.

For example, the location that is not affected by restarting execution of then operating system 119 in the processor 101 can be a predefined non-volatile memory configured in the memory module 113, such as the memory configured to implement/support Serial Presence Detect (SPD).

For example, the location that is not affected by restarting execution of then operating system 119 in the processor 101 can be a Baseboard Management Controller (BMC) 139 connected to the processor 101.

For example, the processor 101 decodes, via execution of the first instructions (e.g., error handler 121), the first data (e.g., error data 111) to determine a physical memory address of the error as part of the second data (e.g., error log 127, error event details 143).

After a hardware error, the computing system may not be able to recovery from the error without restarting. Thus, after the executing of the first instructions (e.g., error handler 121), the processor 101 can restart execution of the operating system 119, which can be configured to include second instructions (e.g., error handler 123) programmed to retrieve the second data (e.g., error log 127, error event details 143) from the location and write the second data into a data storage device 106 controlled by the operating system 119.

In some instances, the computing system can recovery from the error without restarting. Thus, after the executing of the first instructions (e.g., error handler 121), the processor 101 can resume the suspended execution of the operating system 119, which can be configured to include second instructions (e.g., error handler 123) programmed to write the second data into a data storage device 106 controlled by the operating system 119.

Optionally, the processor 101 determines, via execution of the first instructions (e.g., error handler 121), an operating parameter 147 of the computing system at a time of the error; and the second data (e.g., error log 127, error event details 143) includes the operating parameter 147.

For example, the operating parameter 147 can be a temperature of the memory module 113, a temperature of the processor 101, a setting 145 of the memory module 113, or a timing parameter of operating the memory module 113, or any combination thereof.

Optionally, the second data (e.g., error log 127, error event details 143) further includes an identifier of the memory module 113, or an identifier of the processor 101, or any combination thereof.

In some implementations, when executed by a microprocessor (e.g., processor 101), the first instructions (e.g., error handler 121) are programmed to decode the first data (e.g., error data 111) stored in registers 107 of a microprocessor (e.g., processor 101) in response to the error in the memory module 113, generate the second data (e.g., error log 127, error event details 143) from a result of decoding the first data (e.g., error data 111), and communicate with the memory module 113 to store the second data into the non-volatile memory 141 of the memory module 113. Alternatively, or in combination with storing the second data into the non-volatile memory 141 of the memory module 113, the first instructions (e.g., error handler 121) are programmed to communicate the second data to a Baseboard Management Controller (BMC) 139 connected to the microprocessor (e.g., processor 101).

For example, the non-volatile memory 141 is configured to implement Serial Presence Detect (SPD); and the registers 107 are configured to implement Machine Check Architecture (MCA).

In some implementations, when executed by a microprocessor (e.g., processor 101), the first instructions (e.g., error handler 121) are programmed to: retrieve, from registers 107 of the microprocessor (e.g., processor 101), the first data (e.g., error data 111) about the hardware error; generate, based on the first data, the second data (e.g., error log 127, error event details 143) about the hardware error prior to restarting execution of an operating system 119 following the hardware error; and communicating the second data from the microprocessor (e.g., processor 101) to a controller (e.g., Baseboard Management Controller (BMC) 139) connected to the microprocessor. The controller is configured to monitor operations of the microprocessor and to record the second data.

The second data (e.g., error log 127, error event details 143) can be generated based on the first data (e.g., error data 111) and third data (e.g., settings 145, operating parameters 147, runtime data 125) located in the computing device having the microprocessor (e.g., processor 101) but outside of the microprocessor (e.g., inside the memory module 113) at a time of the hardware error. Thus, merely recording the first data (e.g., error data 111) is insufficient to generate the second data (e.g., error log 127, error event details 143) after restarting the execution of the operating system 119, since restarting can erase the third data.

Figure 7:
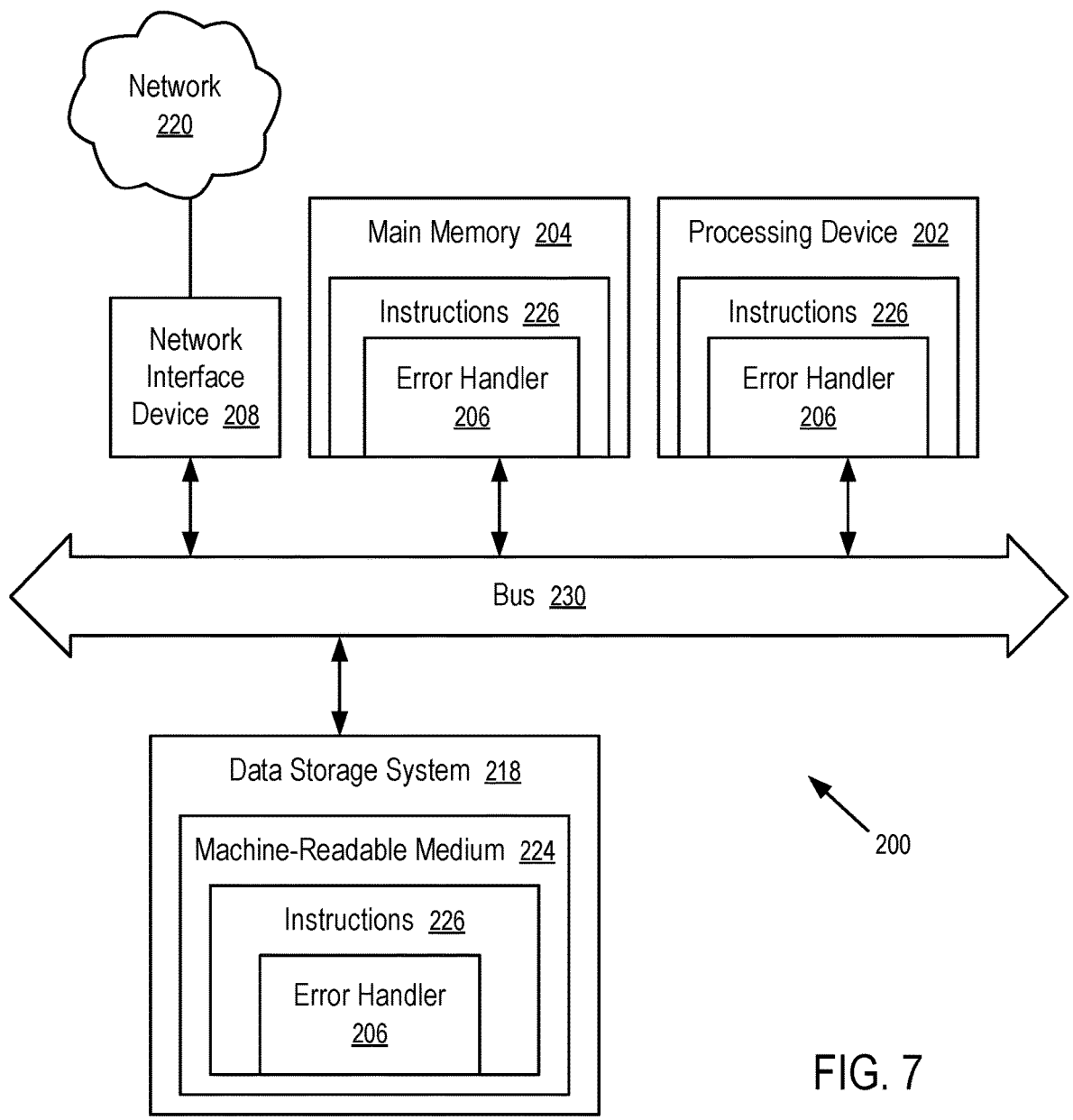
FIG. 7 is a block diagram of an example computer system in which embodiments of the present disclosure can operate.

FIG. 7 illustrates an example machine of a computer system 200 within which a set of instructions, for causing the machine to perform any one or more of the methodologies discussed herein, can be executed. In some embodiments, the computer system 200 can correspond to a host system that includes, is coupled to, or utilizes a memory sub-system or can be used to perform the operations of an error handler 206 (e.g., to execute instructions to perform operations corresponding to the error handler 121 and/or the error handler 123 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a server, a personal computer (PC), a tablet PC, a set-top box (STB), a Personal Digital Assistant (PDA), a cellular telephone, a web appliance, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable medium 224, data storage system 218, and/or main memory 204 can correspond to a memory sub-system.

In one embodiment, the instructions 226 include instructions to implement functionality corresponding to an error handler 206 (e.g., operations of the error handler 121 and/or the error handler 123 described with reference to FIGS. 1-6). While the machine-readable medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In general, a computing device to implement the techniques of FIGS. 2 and/or 3 can be a computing system having a host system and a memory sub-system. The memory sub-system can include media, such as one or more volatile memory devices, one or more non-volatile memory devices (e.g., memory module 113), or a combination of such.

A memory sub-system can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

For example, the computing system can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The host system of the computing system is coupled to one or more memory sub-systems. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system can include a processor chipset (e.g., processor 101) and a software stack executed by the processor chipset. The processor chipset can include one or more cores, one or more caches, a memory controller (e.g., 105) (e.g., NVDIMM controller), and a storage protocol controller (e.g., PCIe controller, SATA controller). The host system uses the memory sub-system, for example, to write data to the memory sub-system and read data from the memory sub-system.

The host system can be coupled to the memory sub-system via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system and the memory sub-system. The host system can further utilize an NVM Express (NVMe) interface to access components (e.g., memory module 113) when the memory sub-system is coupled with the host system by the PCIe interface. The physical host interface can provide an interface for passing control, address, data, and other signals between the memory sub-system and the host system. In general, the host system can access one or more memory sub-systems via a same communication connection, multiple separate communication connections, and/or a combination of communication connections.

A processing device of the host system can be, for example, a microprocessor, a central processing unit (CPU), a processing core of a processor, an execution unit, etc. In some instances, the controller 105 can be referred to as a memory controller, a memory management unit, and/or an initiator. In one example, the controller 105 controls the communications over a bus 100 coupled between the host system and the memory sub-system (e.g., memory modules 113). In general, the controller 105 can send commands or requests to the memory sub-system for desired access to memory modules 113. The controller 105 can further include interface circuitry to communicate with the memory sub-system.

The memory modules 113 can include any combination of the different types of non-volatile memory components and/or volatile memory components. The volatile memory devices can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory module 113 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory modules 113 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory modules 113 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory module 113 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
 storing, in a computing system, data representative of a configurable error handling policy;
 detecting, by a processor of the computing system, a memory error in a memory module, the memory module manufactured to have a first amount of repair resources;
 generating, by the processor, first data about the memory error;
 writing, into registers in the processor, the first data;
 identifying a second amount of repair resources currently available in the memory module to implement repairs; and
 determining, by the computing system based on the second amount of repair resources, the first data, and the error handling policy, whether to perform a post production repair at a memory address having the memory error.

2. The method of claim 1, further comprising:
 receiving, in the computing system, an input identifying the first amount of repair resources available in the memory module as manufactured;
 writing the input to a configuration file of the error handling policy; and
 storing, in the computing system, historic data identifying repairs performed in the memory module;
 wherein the identifying of the second amount of repair resources currently available in the memory module to implement repairs is based on the first amount of repair resources and the historic data of repairs performed in the memory module.

3. The method of claim 2, wherein the historic data of repairs performed in the memory module is stored in a non-volatile memory of the memory module.

4. The method of claim 3, wherein the non-volatile memory is configured to support Serial Presence Detect (SPD).

5. The method of claim 4, further comprising:
receiving, in the computing system, a list identifying a plurality of memory addresses; and
writing the list to the configuration file of the error handling policy;
wherein the determining of whether to perform the post production repair is further based at least in part on whether the memory address is in the plurality of memory addresses.

6. The method of claim 5, further comprising:
predicting the plurality of memory addresses based on risk assessment.

7. The method of claim 6, wherein the plurality of memory addresses are predicted to have memory errors based on a pattern of operations in the computing system.

8. The method of claim 5, wherein the post production repair is selected for the memory address in response to the memory address being in the plurality of memory addresses and before the memory error is determined to be non-recoverable.

9. The method of claim 5, wherein the post production repair is not selected for the memory address in response to a determination that there are insufficient repair resources available to repair a plurality of errors in the memory module for a subsequent restart of the computing system.

10. The method of claim 5, wherein the determining of whether to perform the post production repair is performed in a Baseboard Management Controller (BMC) connected to the processor; and the method further comprises:
generating second data about the memory error based at least in part on the first data in the registers; and
storing the second data in a storage device of the Baseboard Management Controller (BMC), wherein the determining of whether to perform the post production repair is based on the second data.

11. An apparatus, comprising:
a Baseboard Management Controller (BMC) having a storage device configured to store data representative of a first error handling policy having a configuration file;
a memory module having a non-volatile memory and a volatile memory, the memory module manufactured to have a first amount of repair resources; and
a microprocessor coupled to the memory module and the Baseboard Management Controller (BMC), the microprocessor configured via instructions to, in response to an error in the memory module and prior to restarting of the apparatus:
store, in registers of the microprocessor and in response to the error in the memory module, first data about the error;
decode the first data about the error to generate second data about the error; and
communicate with the Baseboard Management Controller (BMC) to store the second data into the storage device of the Baseboard Management Controller (BMC);
wherein the Baseboard Management Controller (BMC) is configured to determine, based on a second amount of repair resources currently available in the memory module to implement repairs, the second data, and the first error handling policy having the configuration file, whether to perform a post production repair at a memory address having the error.

12. The apparatus of claim 11, wherein the microprocessor is further configured to determine whether to perform the post production repair at the memory address having the error based on a list of memory addresses specified for a second error handling policy processed using an operating system executed by the microprocessor.

13. The apparatus of claim 12, wherein the microprocessor is further configured to predict the list of memory addresses based on risk assessment and an operation pattern of the microprocessor.

14. The apparatus of claim 12, wherein the microprocessor is further configured via instructions in a Basic Input/Output System (BIOS) of the apparatus to store, in the non-volatile memory of the memory module, historic data of post production repairs performed in the memory module; the configuration file identifies first repair resources as manufactured in the memory module; and the apparatus is configured to identify, based on the configuration file and the historic data, second repair resources in the memory module available to perform the post production repair at the memory address.

15. The apparatus of claim 14, wherein the non-volatile memory is configured to implement Serial Presence Detect (SPD); and the registers are configured to implement Machine Check Architecture (MCA).

16. The apparatus of claim 15, wherein the second error handling policy processed using the operating system executed by the microprocessor is configured to select from memory addresses having uncorrectable errors for repair; and the first error handling policy implemented in the Baseboard Management Controller (BMC) is configured to select from memory addresses having non-recoverable uncorrectable errors for repair.

17. A non-transitory computer readable storage medium storing instructions which, when executed by a microprocessor in a computing device, causes the computing device to perform a method, comprising:
generating, based on decoding first data in registers in the microprocessor about a memory error in a memory module in the computing device, second data about the memory error, the second data containing a memory address of the memory error, the memory module manufactured to have a first amount of repair resources;
storing, in a non-volatile memory, the second data; and
determining, based on a second amount of repair resources currently available in the memory module to implement repairs, the second data, and a configurable error handling policy, whether to perform a post production repair at the memory address of the memory error.

18. The non-transitory computer readable storage medium of claim 17, wherein the method further comprises:
configuring the error handling policy to identify a list of memory addresses, wherein the determining of whether to perform the post production repair is based at least in part on whether the memory address is in the list.

19. The non-transitory computer readable storage medium of claim 18, wherein the method further comprises:
predicting the list of memory addresses based on risk assessment for an operation pattern of the computing device.

20. The non-transitory computer readable storage medium of claim 17, wherein the method further comprises:
storing, in a configuration file of the error handling policy, first data identifying repair resources of the memory module as manufactured, wherein the determining of whether to perform the post production repair is based at least in part on whether there are sufficient repair resources in the memory module for the memory address;

writing, to a Serial Presence Detect (SPD) memory in the memory module, status data about repairs performed in the memory module; and determining, based on the status data in the Serial Presence Detect (SPD) memory and the first data in the configuration file, second data identifying currently available repair resources in the memory module in determination of whether there are sufficient repair resources for the memory address.

* * * * *